United States Patent
Minssen et al.

(10) Patent No.: US 12,259,942 B2
(45) Date of Patent: Mar. 25, 2025

(54) SYSTEMS AND METHODS FOR OPTIMIZATION OF TIME EVOLUTION FOR QUANTUM COMPUTER-BASED EIGENVALUE ESTIMATION

(71) Applicant: JPMORGAN CHASE BANK, N.A., New York, NY (US)

(72) Inventors: Pierre Minssen, New York, NY (US); Romina Yalovetzky, Buenos Aires (AR); Dylan Herman, Woodcliff Lake, NJ (US); Marco Pistoia, Amawalk, NY (US); Alexander Buts, Vernon Hills, IL (US); Shaohan Hu, Yorktown Heights, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 869 days.

(21) Appl. No.: 17/331,472

(22) Filed: May 26, 2021

(65) Prior Publication Data

US 2022/0382830 A1 Dec. 1, 2022

(51) Int. Cl.
*G06F 17/16* (2006.01)
*G06F 7/22* (2006.01)
*G06N 10/00* (2022.01)

(52) U.S. Cl.
CPC ............ *G06F 17/16* (2013.01); *G06F 7/22* (2013.01); *G06N 10/00* (2019.01)

(58) Field of Classification Search
CPC . G06F 17/11; G06F 17/16; G06F 7/22; G06N 10/00; G06N 10/20; G06N 10/60
See application file for complete search history.

(56) References Cited

U.S. PATENT DOCUMENTS

| 2023/0114370 A1* | 4/2023 | Akhalwaya | G06F 17/11 |
| | | | 257/191 |
| 2023/0153373 A1* | 5/2023 | Wang | G06N 5/01 |
| | | | 708/553 |

OTHER PUBLICATIONS

A.W. Harrow et al., Quantum algorithm for linear systems of equations, arXiv:0811.3171v3 [quant-ph], 2009 (Year: 2009).*
R. Yalovetzky et al., Hybrid HHL with Dynamic Quantum Circuits on Real Hardware, arXiv:2110.15958v5 [quant-ph], 2023 (Year: 2023).*

(Continued)

*Primary Examiner* — Emily E Larocque
(74) *Attorney, Agent, or Firm* — GREENBERG TRAURIG LLP

(57) ABSTRACT

A method may include: a computer program populating a Hermitian matrix A with input data; calculating an upper bound a for a maximum eigenvalue for the Hermitian matrix A; initializing a time evolution value $t=1/a$; generating a first quantum computer program using the time evolution value t; communicating the first quantum computer program to a quantum computer; receiving a result including a binary value for each n-bit string and a probability for each binary value; converting each binary value into an integer; identifying a maximum absolute value of the integers; determining a value x for the maximum absolute value of all of the integers; updating the time evolution value t based on the value of x; generating a second quantum computer program using the updated time evolution value t; and communicating, by the classical computer program, the second quantum computer program to the quantum computer.

18 Claims, 2 Drawing Sheets

(56) References Cited

OTHER PUBLICATIONS

R. Yalovetzky et al., NISQ-HHL: Portfolio Optimization for Near-Term Quantum Hardware, arZiv:2110.15958v1 [quant-ph], 2021 (Year: 2021).*
Rebentrost, Patrick; et al., "Quantum computational finance: Quantum algorithm for portfolio optimization," Nov. 9, 2018.
Harrow, Aram W.; et al., "Quantum algorithm for solving linear systems of equations," Sep. 30, 2009.

* cited by examiner

SYSTEMS AND METHODS FOR OPTIMIZATION OF TIME EVOLUTION FOR QUANTUM COMPUTER-BASED EIGENVALUE ESTIMATION

BACKGROUND OF THE INVENTION

1. Field of the Invention

Embodiments are generally directed to systems and methods for optimization of time evolution for quantum computer-based eigenvalue estimation.

2. Description of the Related Art

Time evolution is used in many calculations. A conventional time evolution procedure works as follows: given a Hermitian matrix A and a time evolution (denoted t), the unitary U is built as $U=e^{2\pi i A t}$. From this, the eigenvalues for U may be estimated. Due to the $2\pi$-periodicity of the imaginary exponential, the estimation of the eigenvalues is based on the fractional part of $\lambda t$, with $\lambda$ an eigenvalue of A. If t is over-estimated ($\lambda t > \frac{1}{2}$), information is lost and the result is false. Finally, an estimation method is used to obtain the first n-bits in the binary decomposition of $\lambda t$ (i.e. $2n\lambda t$). If t is underestimated, this leads to a sub-optimal precision as we will be using less than n bits to represent the eigenvalues of A.

SUMMARY OF THE INVENTION

Systems and methods for optimization of time evolution for quantum computer-based eigenvalue estimation are disclosed. In one embodiment, a method for a method for optimization of time evolution of quantum computer-based eigenvalue estimation may include: (1) receiving, by a classical computer program executed by a classical computer, input data; (2) populating, by the classical computer program, a Hermitian matrix A with the input data; (3) calculating, by the classical computer program, an upper bound a for a maximum eigenvalue (in modulo) for the Hermitian matrix A; (4) initializing, by the classical computer program, a time evolution value t, wherein t=1/a; (5) generating, by the classical computer program, a first quantum computer program using the time evolution value t; (6) communicating, by the classical computer program, the first quantum computer program to a quantum computer, wherein the quantum computer may be configured to execute the first quantum computer program; (7) receiving, by the classical computer program, a result of the execution of the first quantum computer program, wherein the result may include a binary value for each n-bit string and a probability for each binary value; (8) converting, by the classical computer program, each binary value into an integer; (9) identifying, by the classical computer program, a maximum absolute value of the integers; (10) determining, by the classical computer program, a value x for the maximum absolute value of all of the integers; (11) updating, by the classical computer program, the time evolution value t based on the value of x; (12) generating, by the classical computer program, a second quantum computer program using the updated time evolution value t; and (13) communicating, by the classical computer program, the second quantum computer program to a quantum computer, wherein the quantum computer may be configured to execute the second quantum computer program.

In one embodiment, the input data may include market data, production data, or scheduling data.

In one embodiment, the upper bound a is equal to $2*sqrt(tr(A*A))$, where sqrt is the square root function, tr is a trace operator and $A^*$ is the conjugate transpose of the Hermitian matrix A.

In one embodiment, the method may further include filtering, by the classical computer program, n-bit strings having probabilities below a noise level.

In one embodiment, the noise level may be based on a number of gates in the quantum computer program and an infidelity level of gates in the quantum computer.

In one embodiment, the second quantum computer program may include a quantum Hamiltonian evolution circuit.

In one embodiment, the time evolution value t is updated when $2^{n-1}-1-x$ is less than or equal to 1.

In one embodiment, the step of updating the time evolution value t based on the maximum value of x may include: setting the time evolution value t to $t=t*2^n$ in response to the value of x being zero; or setting the time evolution value t to $t=t*2^{n-1}/x$ in response to the value of x not being equal to zero.

In another embodiment, an electronic device may include: a memory storing a classical computer program and a computer processor. The classical computer program is configured to: receive input data; populate a Hermitian matrix A with the input data; calculate an upper bound a for a maximum eigenvalue (in modulo) for the Hermitian matrix A; initialize a time evolution value t, wherein t=1/a; generate a first quantum computer program using the time evolution value t; communicate the first quantum computer program to a quantum computer, wherein the quantum computer is configured to execute the first quantum computer program; receive a result of the execution of the first quantum computer program, wherein the result may include a binary value for each n-bit string and a probability for each binary value; convert each binary value into an integer; identify a maximum absolute value of the integers; determine a value x for the maximum absolute value of all of the integers; update the time evolution value t based on the value of x; generate a second quantum computer program using the updated time evolution value t; and communicate the second quantum computer program to a quantum computer, wherein the quantum computer is configured to execute the second quantum computer program.

In one embodiment, the input data may include market data, production data, or scheduling data.

In one embodiment, the upper bound a is equal to $2*sqrt(tr(A*A))$, where sqrt is the square root function, tr is a trace operator and $A^*$ is the conjugate transpose of the Hermitian matrix A.

In one embodiment, the classical computer program may be further configured to filter n-bit strings having probabilities below a noise level.

In one embodiment, the noise level may be based on a number of gates in the quantum computer program and an infidelity level of gates in the quantum computer.

In one embodiment, the second quantum computer program may include a quantum Hamiltonian evolution circuit.

In one embodiment, the time evolution value t is updated when $2^{n-1}-1-x$ is less than or equal to 1.

In one embodiment, the classical computer program may be configured to set the time evolution value t to $t=t*2^n$ in response to the value of x being zero; or setting the time evolution value t to $t=t*2^{n-1}/x$ in response to the value of x not being equal to zero.

In another embodiment, a system may include: an electronic device comprising a memory storing a classical computer program and a computer processor; and a quantum computer in communication with the electronic device. The classical computer program is configured to receive input data, to populate a Hermitian matrix A with the input data, calculate an upper bound a for a maximum eigenvalue (in modulo) for the Hermitian matrix A, initialize a time evolution value t, wherein t=1/a, generate a first quantum computer program using the time evolution value t, and communicate the first quantum computer program to a quantum computer. The quantum computer is configured to execute the first quantum computer program. The classical computer program is configured to receive a result of the execution of the first quantum computer program, wherein the result may include a binary value for each n-bit string and a probability for each binary value, convert each binary value into an integer, identify a maximum absolute value of the integers, determine a value x for the maximum absolute value of all of the integers, update the time evolution value t based on the value of x, generate a second quantum computer program using the updated time evolution value t, and communicate the second quantum computer program to a quantum computer. The quantum computer is configured to execute the second quantum computer program.

In one embodiment, the upper bound a is equal to $2*\sqrt{tr(A*A)}$, where sqrt is the square root function, tr is a trace operator and $A*$ is the conjugate transpose of the Hermitian matrix A.

In one embodiment, the classical computer program is further configured to filter n-bit strings having probabilities below a noise level, wherein the noise level is based on a number of gates in the quantum computer program and an infidelity level of gates in the quantum computer.

In one embodiment, the time evolution value t is updated when $2^{n-1}-1-x$ is less than or equal to 1, the time evolution value is set to t to $t=t*2^n$ in response to the value of x being zero or to $t=t*2^{n-1}/x$ in response to the value of x not being equal to zero.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Systems and methods for optimization of time evolution for quantum computer-based eigenvalue estimation are disclosed.

Figure 1:
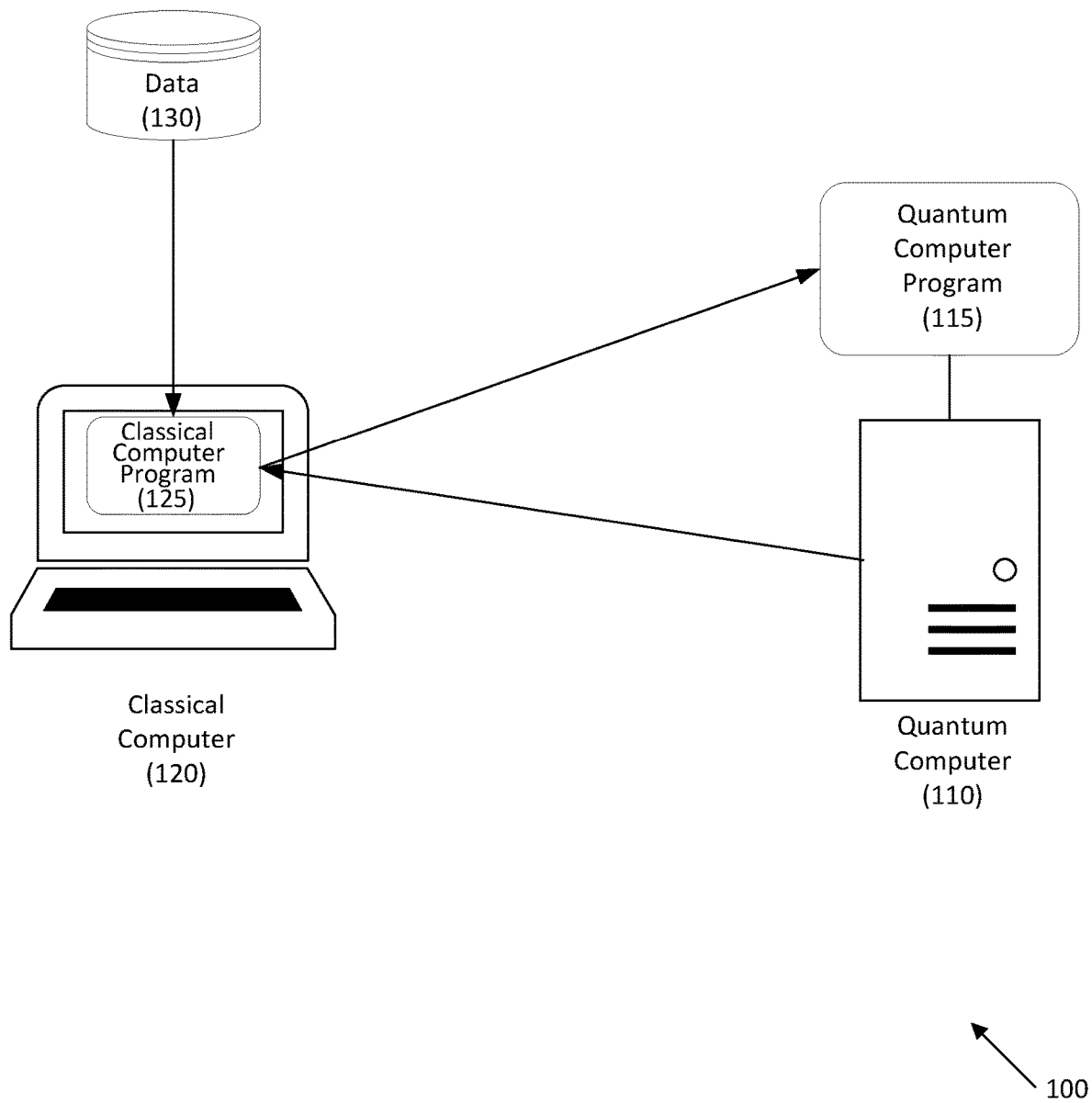
FIG. 1 depicts an exemplary system for optimization of time evolution for quantum computer-based eigenvalue estimation according to an embodiment.

Referring to FIG. 1, a system for optimization of time evolution for quantum computer-based eigenvalue estimation is disclosed according to an embodiment. System 100 may include quantum computer 110 that may execute quantum computer program 115. Classical computer 120 may interface with quantum computer program 115 using computer program 125. Classical computer 120 may be any suitable classical computing device, including servers, workstations, desktop, notebook, laptop, or tablet computers, etc.

Classical computer program 125 may provide input to, and receive output from, quantum computer 110 and/or quantum computer program 115. In one embodiment, classical computer program 125 may provide quantum computer program 115 to quantum computer 110. Classical computer program 125 may display the results of the execution of quantum computer program 115 on a display.

Database 130 may be a source of data that may be used to determine the time series value, such as production data (e.g., cost of raw materials, number of widgets produced by a machine per hour, consumption of this machine, etc.) for production optimization, market data (e.g., holdings, asset costs, etc.) for portfolio optimization, scheduling information (e.g., time per task, number of assets to perform the tasks, sequentiality of the tasks, etc.) for scheduling optimization, etc.

In one embodiment, classical computer program 125 may calculate a mean out of time series for the data from database 130 and may provide the time series value to quantum computer program 115. Classical computer program 125 may further generate quantum computer program 115 (e.g., a Hamiltonian evolution circuit) to be executed by quantum computer 110. Quantum computer 110 may then return results to classical computer program 125 for additional processing.

Figure 2:
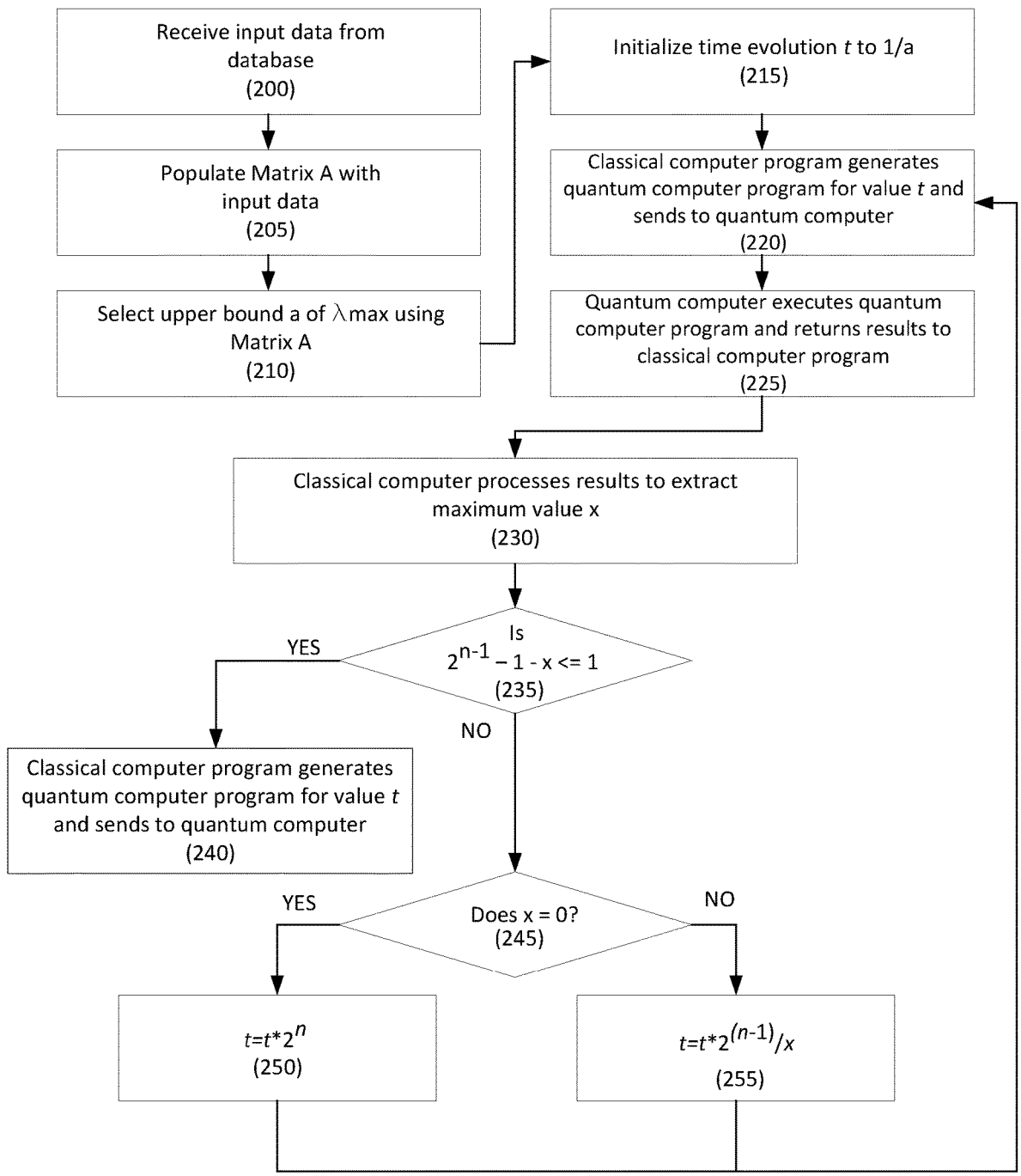
FIG. 2 depicts a method for optimization of time evolution for quantum computer-based eigenvalue estimation according to an embodiment.

Referring to FIG. 2, a method for optimization of time evolution for quantum computer-based eigenvalue estimation is disclosed according to an embodiment. In one embodiment, the method may be performed by a computer program executed by a computing device in conjunction with a quantum computer program executed by a quantum computer or quantum computer simulator.

In step 200, input data for a calculation of interest may be received from a database. For example, the input data may be historical market data, production data, scheduling data, etc. Any suitable input data for which optimization may be desired may be used as is necessary and/or desired.

In step 205, a matrix A, which may be a Hermitian matrix, may be populated with the input data.

In step 210, an upper bound value a may be calculated for lmax, the maximum eigenvalue (in modulo) for matrix A. For example, the upper bound a may be set equal to $2*\sqrt{tr(A*A)}$, where sqrt is the square root function, tr is a trace operator and $A*$ is the conjugate transpose of the Hermitian matrix A.

In step 215, the time evolution value t may be initialized using the equation t=1/a.

In step 220, the classical computer program may generate a quantum computer program using the value t and may send the quantum computer program to a quantum computer for execution. For example, the classical computer program may convert the unitary $U=e^{2\pi i A t}$ into a quantum computer program. This unitary depends on t and will be transformed into gates for the quantum computer. Thus, the value t directly impacts the gates. In embodiments, unitary decomposition may be used to decompose the unitary into a quantum program subcomponent. This subcomponent may then be used in a larger quantum computer program that may solve a linear system (e.g., the optimization problem). An example of such is the HHL algorithm described in Harrow et al., "Quantum algorithm for solving linear systems of equations," available at arxiv.org/abs/0811.3171 and Rebentrost et al., "Quantum computational finance: quantum algorithm for portfolio optimization," available at arxiv.org/pdf/

1811.03975.pdf, the disclosures of which are hereby incorporated, by reference, in their entireties.

In step 225, the quantum computer may execute the quantum computer program and may return the results to the classical computer program. The results may be provided as a probability for each n-bit string possible, such as binary states with a probability linked to each state. An extract of the results for n=4 is provided in Table I below:

TABLE I

| Binary | Probability |
|---|---|
| 1110 | 12% |
| 1111 | 13% |
| 0000 | 21% |
| 0001 | 11% |
| 0011 | 9% |
| 0100 | 10% |

In step 230, the classical computer program may extract a value x from the results. The classical computer program, knowing the input t, may convert the filtered results into meaningful values: Value x in TABLE III. $x_i$ may represent the binary output of the quantum computer results, and $x_i/(2^n*t)$ is the Value x.

In one embodiment, to evaluate positive and negatives values, the two's complement encoding method may be used. The first bit corresponds to the sign of the bit. An example integer and value for each binary is provided in Table II below:

TABLE II

| Binary | Probability | Integer |
|---|---|---|
| 1110 | 12% | −2 |
| 1111 | 13% | −1 |
| 0000 | 21% | 0 |
| 0001 | 11% | 1 |
| 0011 | 9% | 3 |
| 0100 | 10% | 4 |

Next, once the integer is known, the value of x may be determined by dividing the integer by $t*2^n$. Using t=50 and n=4, the x values for each integer is illustrated in Table III below:

TABLE III

| Binary | Probability | Integer | Value x |
|---|---|---|---|
| 1110 | 12% | −2 | −0.0025 |
| 1111 | 13% | −1 | −0.00125 |
| 0000 | 21% | 0 | 0 |
| 0001 | 11% | 1 | 0.00125 |
| 0011 | 9% | 3 | 0.00375 |
| 0100 | 10% | 4 | 0.0050 |

Next, the maximum absolute value of all integers is selected. In this case, the maximum absolute value of all integers is 4.

In one embodiment, rather than calculate a value x for each binary, the maximum absolute value may of all integers may be determined and then the value x may be calculated. These values, however, may provide estimated eigenvalues for other uses, comparisons, testing, etc.

To account for noise, the infidelity of each gate in quantum computer E is determined, such as from a specification sheet for the quantum computer. Using the number of gates N in the quantum computer program, the classical computer program may then discard all states in the result that has a probability bellow E*N. In one embodiment, the filtering may occur before or after the conversion.

In step 235, if the value $2^{n-1}-1-x$ is less than or equal to one, the process continues to step 240, the classical computer program may generate a new quantum computer program for the value t and may send the new quantum computer program to the quantum computer for execution. In the example above, the value $2^{n-1}-1-x$ is 3, which is greater than one.

In step 245, if x equals 0, in step 250, the value t is set to $t=t*2^n$. If the value of x is not equal to 0, in step 255, the value t is set to $t=t*2^{(n-1)}/x$. In both cases, the process continues with step 220. In the example, x is not 0, so t is set to $t*2^{n+1}/x$, or 100. The process continues using the value t=100.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

In one embodiment, the processing machine may be a classical computer, a quantum computer, etc.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, a memory stick, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for optimization of time evolution of quantum computer-based eigenvalue estimation comprising:
    receiving, by a classical computer program executed by a classical computer, input data;
    populating, by the classical computer program, a Hermitian matrix A with the input data;
    calculating, by the classical computer program, an upper bound a for a maximum eigenvalue (in modulo) for the Hermitian matrix A;
    initializing, by the classical computer program, a time evolution value t, wherein $t=1/a$;
    generating, by the classical computer program, a first quantum computer program using the time evolution value t;
    communicating, by the classical computer program, the first quantum computer program to a quantum computer, wherein the quantum computer is configured to execute the first quantum computer program;
    receiving, by the classical computer program, a result of the execution of the first quantum computer program, wherein the result comprises a binary value for each n-bit string and a probability for each binary value;
    determining, by the classical computer program, an infidelity level for each gate in the quantum computer;
    discarding, by the classical computer program, the n-bit strings having a probability that is less than a threshold that is based on the infidelity level;
    converting, by the classical computer program, each binary value into an integer;
    identifying, by the classical computer program, a maximum absolute value of the integers;
    determining, by the classical computer program, a value x for the maximum absolute value of all of the integers;
    updating, by the classical computer program, the time evolution value t based on the value of x;
    generating, by the classical computer program, a second quantum computer program using the updated time evolution value t; and
    communicating, by the classical computer program, the second quantum computer program to the quantum computer, wherein the quantum computer is configured to execute the second quantum computer program.

2. The method of claim 1, wherein the input data comprises market data, production data, or scheduling data.

3. The method of claim 1, wherein the upper bound a is equal to $2*sqrt(tr(A*A))$, where sqrt is a square root function, tr is a trace operator and $A*$ is a conjugate transpose of the Hermitian matrix A.

4. The method of claim 1, wherein the threshold is based on a number of gates in the first quantum computer program and the infidelity level.

5. The method of claim 1, wherein the second quantum computer program comprises a Hamiltonian evolution circuit.

6. The method of claim 1, wherein the time evolution value t is updated when $2^{n-1}-1-x$ is less than or equal to 1.

7. The method of claim 1, wherein the step of updating the time evolution value t based on the maximum value of x comprises:
    setting the time evolution value t to $t=t*2^n$ in response to the value of x being zero; or
    setting the time evolution value t to $t=t*2^{n-1}/x$ in response to the value of x not being equal to zero.

8. An electronic device comprising:
    a memory storing a classical computer program; and
    a computer processor;
    wherein the classical computer program is configured to:
        receive input data;
        populate a Hermitian matrix A with the input data;
        calculate an upper bound a for a maximum eigenvalue (in modulo) for the Hermitian matrix A;
        initialize a time evolution value t, wherein $t=1/a$;
        generate a first quantum computer program using the time evolution value t;
        communicate the first quantum computer program to a quantum computer, wherein the quantum computer is configured to execute the first quantum computer program;
        receive a result of the execution of the first quantum computer program, wherein the result comprises a binary value for each n-bit string and a probability for each binary value;
        determine an infidelity level for each gate in the quantum computer;
        discard the n-bit strings having a probability that is less than a threshold that is based on the infidelity level;
        convert each binary value into an integer;
        identify a maximum absolute value of the integers;
        determine a value x for the maximum absolute value of all of the integers;
        update the time evolution value t based on the value of x;
        generate a second quantum computer program using the updated time evolution value t; and
        communicate the second quantum computer program to the quantum computer, wherein the quantum computer is configured to execute the second quantum computer program.

9. The electronic device of claim 8, wherein the input data comprises market data, production data, or scheduling data.

10. The electronic device of claim 8, wherein the upper bound a is equal to $2*sqrt(tr(A*A))$, where sqrt is a square root function, tr is a trace operator and $A*$ is a conjugate transpose of the Hermitian matrix A.

11. The electronic device of claim 8, wherein the threshold level is based on a number of gates in the first quantum computer program and the infidelity level.

12. The electronic device of claim 8, wherein the second quantum computer program comprises a Hamiltonian evolution circuit.

13. The electronic device of claim 8, wherein the time evolution value t is updated when $2^{n-1}-1-x$ is less than or equal to 1.

14. The electronic device of claim 8, the classical computer program is configured to set the time evolution value t to $t=t*2^n$ in response to the value of x being zero or to $t=t*2^{n-1}/x$ in response to the value of x not being equal to zero.

15. A system, comprising:
an electronic device comprising a computer processor and a memory, the memory storing a classical computer program; and
a quantum computer in communication with the electronic device;
wherein:
the classical computer program is configured to receive input data;
the classical computer program is configured to populate a Hermitian matrix A with the input data;
the classical computer program is configured to calculate an upper bound a for a maximum eigenvalue (in modulo) for the Hermitian matrix A;
the classical computer program is configured to initialize a time evolution value t, wherein t=1/a;
the classical computer program is configured to generate a first quantum computer program using the time evolution value t;
the classical computer program is configured to communicate the first quantum computer program to a quantum computer;
the quantum computer is configured to execute the first quantum computer program;
the classical computer program is configured to receive a result of the execution of the first quantum computer program, wherein the result comprises a binary value for each n-bit string and a probability for each binary value;
the classical computer program is configured to determine an infidelity level for each gate in the quantum computer;
the classical computer program is configured to discard the n-bit strings having a probability that is less than a threshold that is based on the infidelity level;
the classical computer program is configured to convert each binary value into an integer;
the classical computer program is configured to identify a maximum absolute value of the integers;
the classical computer program is configured to determine a value x for the maximum absolute value of all of the integers;
the classical computer program is configured to update the time evolution value t based on the value of x;
the classical computer program is configured to generate a second quantum computer program using the updated time evolution value t;
the classical computer program is configured to communicate the second quantum computer program to the quantum computer; and
the quantum computer is configured to execute the second quantum computer program.

16. The system of claim 15, wherein the upper bound a is equal to $2*sqrt(tr(A*A))$, where sqrt is a square root function, tr is a trace operator and A* is a conjugate transpose of the Hermitian matrix A.

17. The system of claim 15, wherein the threshold is based on a number of gates in the first quantum computer program and the infidelity level.

18. The system of claim 15, wherein the time evolution value t is updated when $2^{n-1}-1-x$ is less than or equal to 1; and
the time evolution value t is set to $t=t*2^n$ in response to the value of x being zero or to $t=t*2^{n-1}/x$ in response to the value of x not being equal to zero.

* * * * *